United States Patent [19]

Kronstadt et al.

[11] Patent Number: 4,725,945
[45] Date of Patent: Feb. 16, 1988

[54] DISTRIBUTED CACHE IN DYNAMIC RAMS

[75] Inventors: Eric P. Kronstadt, Westchester County, N.Y.; Sharad P. Gandhi, Santa Clara, Calif.

[73] Assignee: International Business Machines Corp., Armonk, N.Y.

[21] Appl. No.: 651,562

[22] Filed: Sep. 18, 1984

[51] Int. Cl.⁴ .............................................. G11C 7/00
[52] U.S. Cl. .................................... 364/200; 365/189; 365/230
[58] Field of Search ............... 364/200, 900; 365/189, 365/230; 307/475

[56] References Cited

U.S. PATENT DOCUMENTS

| | | | |
|---|---|---|---|
| 3,969,706 | 7/1976 | Proebsting et al. | 365/189 |
| 4,561,702 | 12/1985 | McAdams | 307/475 |
| 4,577,293 | 3/1986 | Matick et al. | 365/189 |
| 4,581,722 | 4/1986 | Takemae | 365/230 |
| 4,584,672 | 4/1986 | Schutz et al. | 365/203 |
| 4,596,001 | 6/1986 | Baba | 365/189 |
| 4,601,018 | 7/1986 | Baum et al. | 365/189 |
| 4,630,240 | 12/1986 | Poteet et al. | 365/186 |
| 4,649,522 | 3/1987 | Kirsch | 365/189 |
| 4,658,382 | 4/1987 | Tran et al. | 365/203 |

*Primary Examiner*—Gary V. Harkcom
*Assistant Examiner*—Randy W. Lacasse
*Attorney, Agent, or Firm*—C. Lamont Whitham; Michael E. Whitham

[57] ABSTRACT

A microcomputer memory system is organized into a plurality of banks (16). Each back consists of an array of static column mode dynamic random access memories (DRAMs) of the type having an on-chip static buffer for storing an entire row. The static buffers associated with each bank functions as a distributed cache (24) to hold the last accessed row for the associated bank. A memory controller (18) receives real addresses from a CPU (10) or other device on the memory bus (14) and extracts bank and row numbers from the address. The memory controller determines whether the accessed row for a memory bank is in the distributed cache and, if it is, accesses the distributed cache for that bank. Otherwise, the memory controller switches the contents of the distributed cache with the contents of the addressed row for that bank.

4 Claims, 6 Drawing Figures

DISTRIBUTED CACHE IN DYNAMIC RAMS

BACKGROUND OF THE INVENTION

The present invention is generally related to memory systems for microcomputers, and more particularly to a memory controller for static column mode dynamic random access memories (DRAMs) which significantly improves system performance.

A typical microcomputer system has the central processing unit (CPU) 10 connected to the memory 12 over a bus 14 as shown in FIG. 1. To access data in the memory banks 16, the CPU 10 goes through a memory controller 18. The memory controller 18 performs the task of refreshing the DRAMs, bank interleaving, clocking and handshake protocol with the CPU 10. Some microcomputers also have an instruction and/or data cache 20 to increase system throughput. The cache is a fast memory, and it normally resides on the CPU side of the bus. The control logic associated with the cache attempts to maximize the number of accesses to the cache. An access to the cache is termed a "hit". The main memory is accessed only when the desired word is not available in the cache, i.e. a "miss".

An example of a prior art system is disclosed in U.S. Pat. No. 4,156,290 issued to Lucin Lanza. This patent discloses a random access memory (RAM) composed of a plurality of memory chips, each chip having input and output registers. The memory controller comprises a staticizer register which stores the most significant part of the current address. The output of the register comprises a channel connected to an address comparison circuit and to the inputs of the RAM chips. Each address for the memory comprises a first part which addresses all the words of the memory elements stored in the address identified by the first part. All the addressed words are stored in corresponding address registers. The second part of the address enables the selection of the output register associated therewith. With this procedure, the reading operation for a block of information requires only one memory access time plus the read time of the output registers.

U.S. Pat. No. 4,382,278 to Daren R. Appelt discloses a computer system wherein a plurality of registers and at least one workspace is provided in main memory. In addition, there is a workspace cache memory made up of registers within the central processing unit (CPU). Those registers correspond to the registers in the workspace in the main memory. Computer operations are implemented using the contents of the workspace cache registers whose contents are transmitted to the corresponding working registers in the workspace of the main memory in the event of a context switch. The architecture of this workspace system achieves high speed register-to-register operations and high speed context switching.

DRAMs with static column mode now offered by some manufacturers represents a new trend in dynamic memories. They have an on-chip static buffer for storing an entire row (256 bits for a 64 Kbit DRAM chip). A 64K DRAM has 256 rows of 256 bits each. A 256K DRAM has 512 rows of 512 bits each, whereas a 64K by 4 DRAM has 4 times 256 rows of 256 bits. Once the row is stored in this buffer, any bit can be accessed (read or written) in this row very fast. For a 130 ns. cycle time DRAM, the cycle time from the buffered row is only 40 ns. as illustrated in FIG. 2.

SUMMARY OF THE INVENTION

It is therefore an object of the present invention to use the on-chip static buffer of DRAMs in such a way as to substantially increase the overall performance of microcomputer systems.

It is another object of this invention to provide a memory controller designed to exploit the on-chip buffers of DRAMs to significantly improve system performance.

The objects of the invention are attained by organizing a microcomputer memory system into a plurality of banks, each bank consisting of an array of static column mode dynamic random access memories of the type having an on-chip static buffer for storing an entire row. According to the invention, the static buffers associated with each bank are used as a distributed cache to hold the last accessed row for the associated bank. A memory controller receives real addresses on the memory bus and extracts bank and row numbers from the address. The memory controller determines whether the accessed row for a memory bank is in the distributed cache and, if it is, accesses the distributed cache for that bank. Otherwise, the memory controller switches the contents of the distributed cache with the contents of the addressed row for that bank. Because access times to the static buffers are very short, a significant increase in system performance is achieved.

BRIEF DESCRIPTION OF THE DRAWINGS

The foregoing and other objects, advantages and aspects of the invention will be better understood from the following detailed description with reference to the drawings, in which.

DETAILED DESCRIPTION OF THE INVENTION

According to the invention, the static buffer on the DRAM can be looked upon as an on-chip cache for the currently addressed row. If a new access requires a bit from a different row, the old one in the buffer is written back into the DRAM cell matrix and the new one loaded into the buffer automatically in just 130 ns. Thus, operation is at 40 ns. from the static buffer with occasional overhead of 130 ns. when the buffered row has to be switched, these figures being typical for currently available DRAMs.

Figure 1:
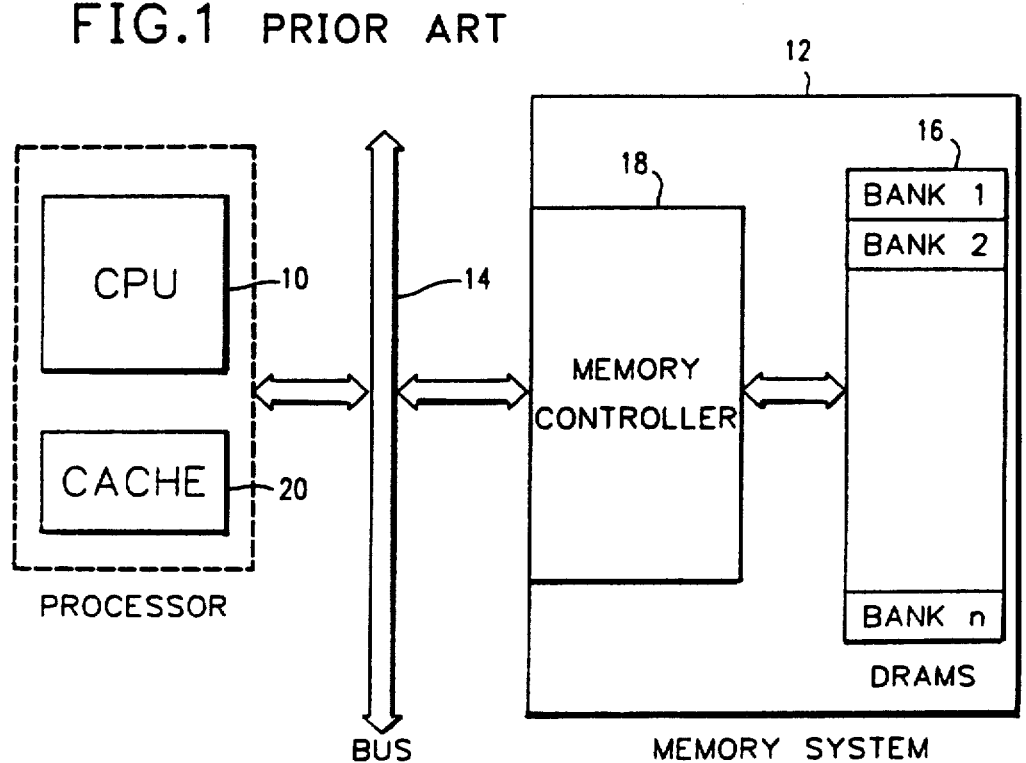
FIG. 1 is a block diagram of a typical prior art microcomputer/memory interface.
Figure 2:
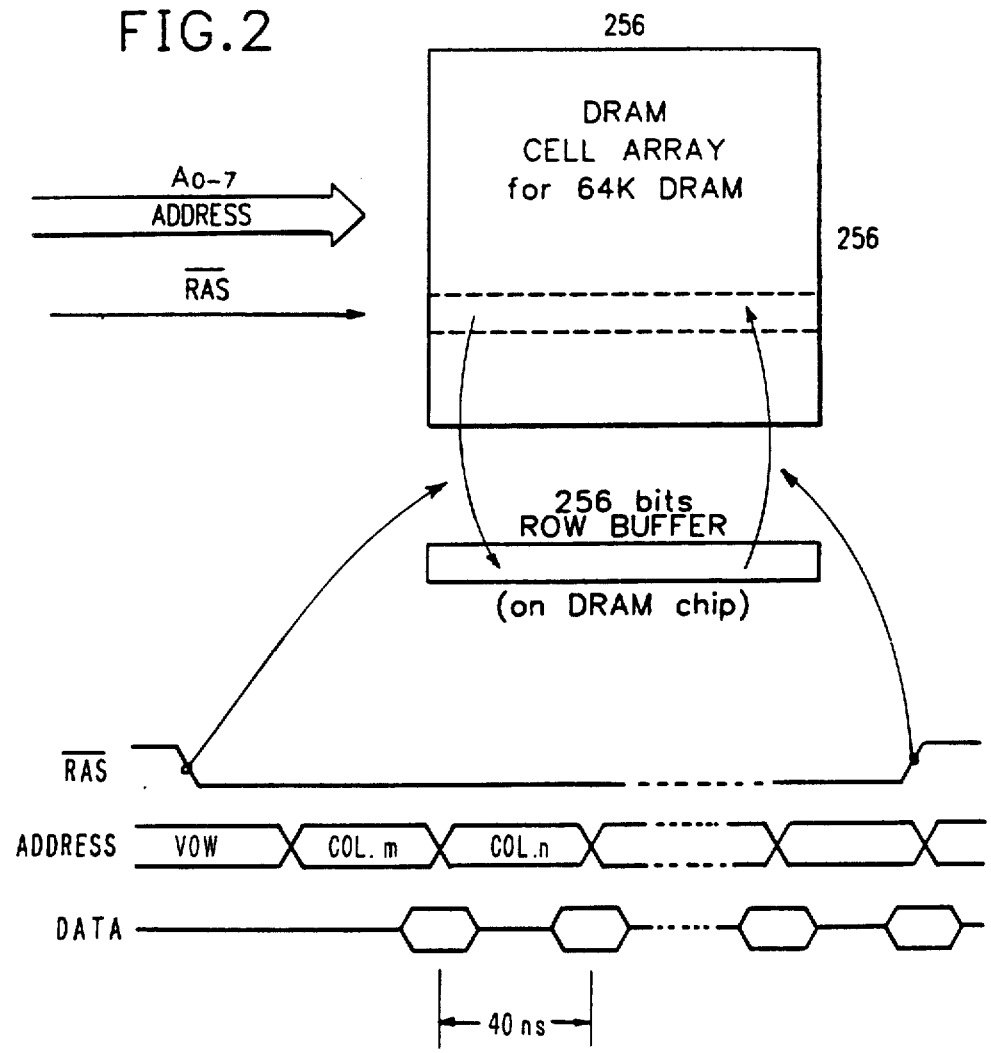
FIG. 2 is a block and timing diagram showing the static column mode row buffer operation of a DRAM.
Figure 3:
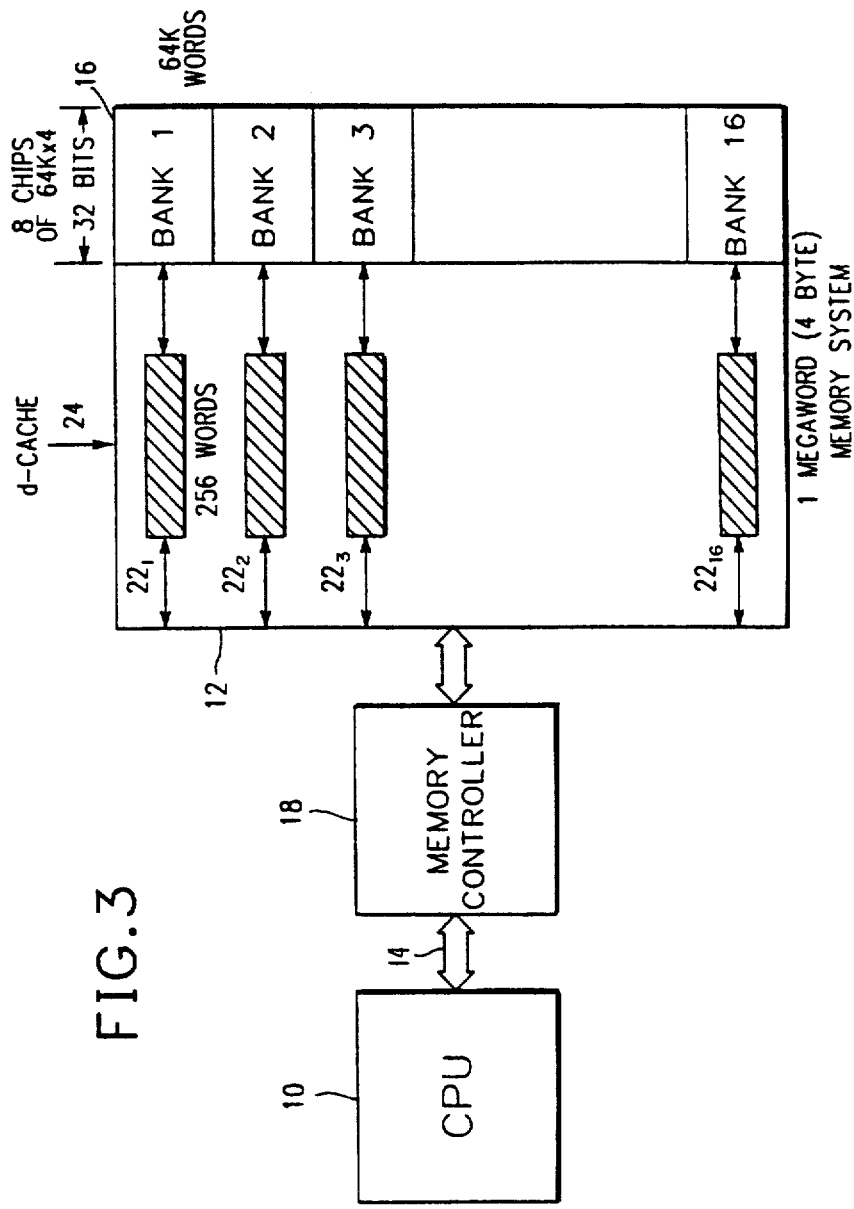
FIG. 3 is a block diagram of the general concept of a d-cache associated with banks of DRAMs according to an illustrative embodiment of the invention.

In an illustrative embodiment shown in FIG. 3, the memory 12 is orgainized in sixteen banks with each bank consisting of an array of eight 64K by 4 DRAMs. Each bank has a 256 word or 1K byte static buffer $22_1$ to $22_{16}$. The static buffers associated with the banks are referred to as "d-cache" 24 for distributed cache. The d-cache 24 is a fast access buffer associated with the bank. It holds the last accessed row for the associated bank. It should be noted that the d-cache is physically on the DRAM chips and is not added externally to the system. Moreover, it caches everything, including data, instructions, stack and so forth. The term "distributed" emphasizes two aspects of the invention. First, the d-cache is not tightly coupled to the CPU but is on the memory side of the system, and second, a unit of d-cache is strictly associated with a definite memory bank.

Figure 4:
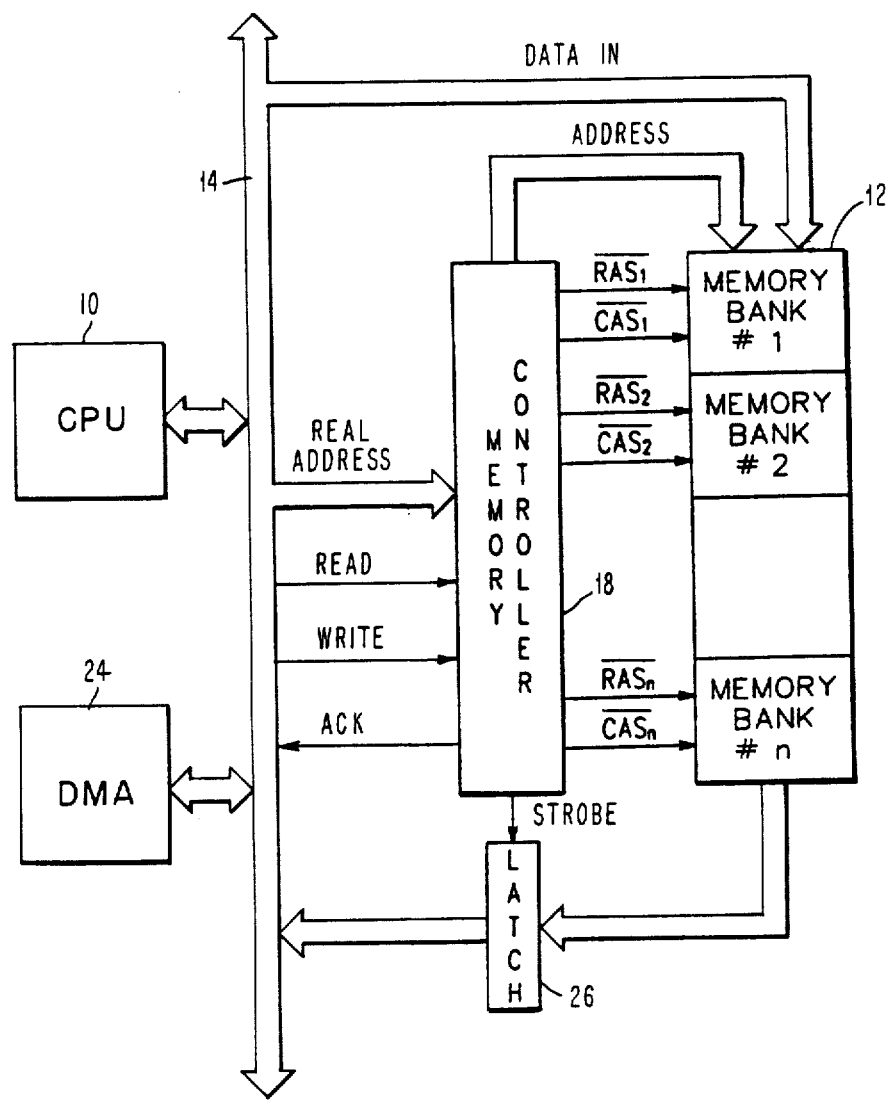
FIG. 4 is a more detailed block diagram showing the input and output signal lines of the memory controller according to the invention.

The invention is not limited to the specific illustrative embodiment shown in FIG. 3, and therefore reference is now made to FIG. 4 which shows the memory 12 in more generalized form organized into a plurality of banks numbered 1 to n. FIG. 4 also shows in more detail the input and output signal lines of the memory controller 18. The memory controller 18 receives real addresses from the CPU 10 (or some other DMA unit 24 on the bus 14) and accesses the DRAMs for read or write operation. It does the refreshing of the DRAMs. It also keeps track of the row of each bank currently cached in the d-cache. The memory controller also maintains all the timing for the DRAMs in terms of refresh and access times. It also provides for the proper handshake protocol with the bus. For each bank, the memory controller maintains two fields, the number of the row which is currently in the d-cache and a valid entry flag for the d-cache as shown in the table below:

D-CACHE CONTROL TABLE

| | | |
|---|---|---|
| bank #0 | 003 | 0 |
| bank #1 | 251 | 1 |
| bank #2 | 035 | 1 |
| bank #15 | 117 | 0 |
| | row # cached | valid bit |

The valid bits for all banks are set to invalid(=0) after power-on. The DRAMs use the buffer also during the refresh operation, destroying the d-cache contents. Thus, the valid bits are also set to 0 following a refresh operation in a bank.

On being accessed from the bus, the memory controller extracts the bank and row numbers from the address. The physical address break-up is as follows:

| Unit # | Row Addr. | Bank # | Column # | Byte # |
|---|---|---|---|---|
| | Row Address for the Bank # | | Address within the d-cache | |

The memory controller 18 determines if the accessed row for that bank is already in the d-cache (a hit). If it is, then the memory controller sends out the column address (position within the d-cache) and activates the column address select (CAS) line for that bank. An active CAS for a bank selects that bank for access. Such a hit access is very fast, on the order of 35 to 40 ns. If the accessed word is not in the d-cache (a miss), then the contents of the d-cache have to be switched. To do that, the row address select (RAS) for that bank is made inactive and made active again with the row number of the new address. This operation, taking only 130 ns., writes back the d-cache contents into the DRAM cell matrix and loads the entire new row into the d-cache. This extremely short time needed to switch the entire d-cache contents is one of the major reasons for the good performance of the invention. The accessed word is read into latch 26 from memory 12 and strobed to the bus 14 by the memory controller 18 in the usual manner.

The refresh operation is imperative for any dynamic RAM. Standard DRAMs require total refreshing (all rows) once every 4 milliseconds. With 256 rows, a row in a bank has to be refreshed, on an average, every 16 microseconds. Since a refresh operation destroys the d-cache contents, every 16 microseconds, the d-cache is declared invalid and the first access following refresh will be a miss. Thus, the d-cache maximum life expectancy, due to refresh, is 16 microseconds. With the availability of extended refresh (64 milliseconds) DRAMs, this is improved to 256 microseconds. To improve the overall system performance, same row numbers of all banks are refreshed simultaneously. This means a total of 256 refresh operations in 4 milliseconds are needed for the entire memory, independent of the number of banks. The refresh operation by itself consists of making the RAS line active and once again making the RAS line inactive. It lasts 130 ns.

The memory controller can address up to 16 banks of memory. With each bank containing 64K words (256K bytes), this amounts to one megaword (4M bytes). This also gives a total of up to 4K words (16K bytes) of d-cache. Since one memory bank yields only one d-cache block, to have more d-cache it is very important to have the total memory broken up in a number of memory banks. 64K by 4 configuration of 256K DRAMs result in more banks than the 256K by 1 configuration. The memory controller as shown in FIG. 4 keeps d-cache for all the banks active or ready for fast access by keeping the RAS line for each bank active. It uses the CAS lines to select the bank it wants to access. Thus, the entire currently used work area (code, data, stack and etc.) of the program can be in d-cache. An additional benefit of multiple memory banks is that one or more redundant memory banks could be supported and brought into action if it is detected that one of the currently running banks has failed. The memory controller can dynamically map the bank number from the processor to the ones currently operating.

Figure 5:
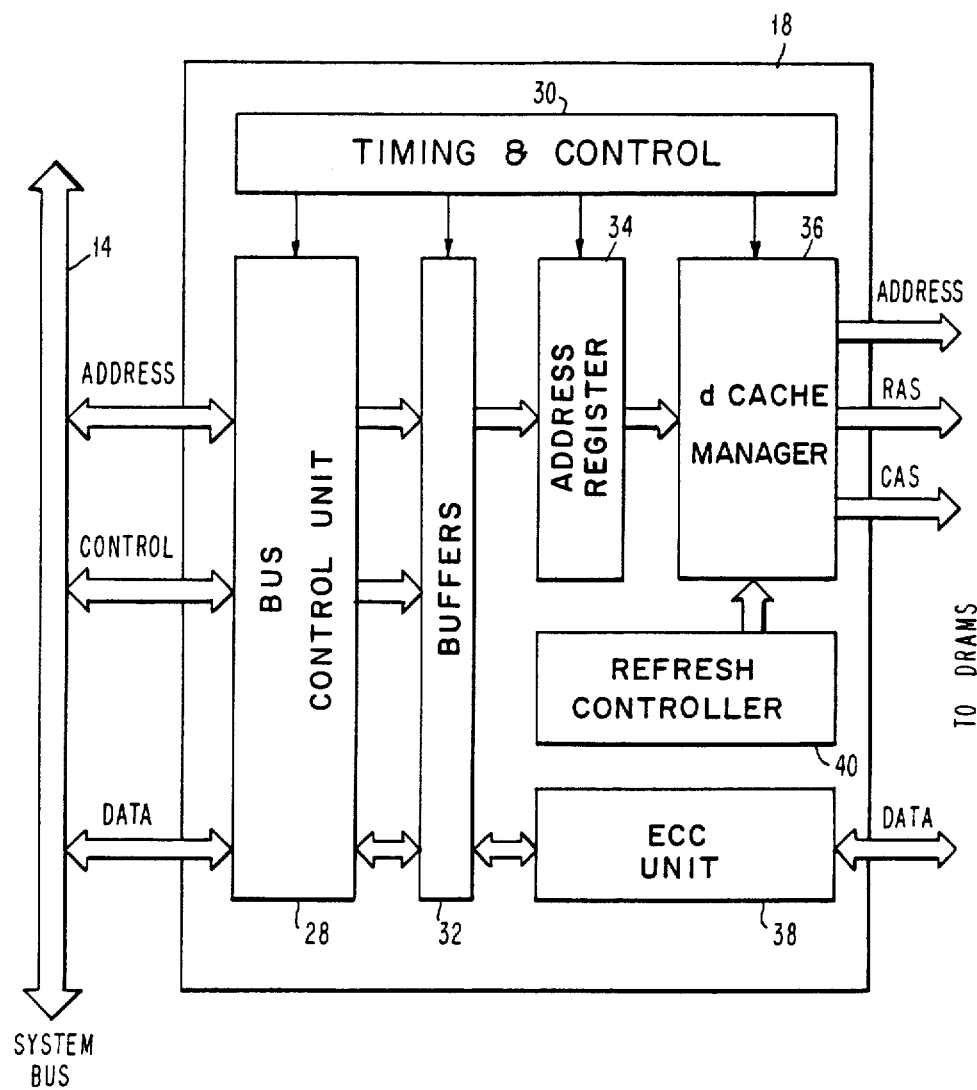
FIG. 5 is a block diagram of the memory controller for the memory system shown in FIG. 4.

FIG. 5 shows a block diagram of the memory controller 18. The bus control unit 28 interfaces with the system bus 14. It receives real addresses and sends and receives data to and from the system bus. All transactions with the CPU or other units on the system bus are synchronized with the bus clock by the timing and control circuitry 30. The CPU or other system bus units can access the memory controller 18 every bus cycle with a new read or write request. If the memory controller is busy and can not accept a request, the bus control unit 28 sends back a RETRY signal asking the requesting unit to repeat the request in the following cycle. If the memory controller 18 is ready to send back the data for a previous request, the bus controller informs systems bus units one cycle in advance so as to reserve the system bus for data transmission. Any request for read or write may take an unknown number of cycles to be processed by the memory controller depending on a number of conditions such as refresh, d-cache hit or miss and the like, but the sequence of execution is strictly the same as the sequence of requests.

A set of buffers 32 and address registers 34 are provided in order to maintain a pipelined flow of addresses and data from the system bus to the d-cache manager 36 and the error checking and correcting (ECC) unit 38 on the one hand, and from the ECC unit 38 to the system bus 14 on the other. The d-cache manager 36 interfaces with the refresh controller 40 to provide the required refresh to the DRAM chips in each of the banks in the memory. In the illustrative embodiment shown in FIG. 3, the d-cache manager interfaces to a 32-bit bus on the DRAM side and drives up to sixteen memory banks. Each bank is made up of ten or forty memory chips (depending on whether the chips are organized "by 1" or "by 4") comprising 32-bit wide memory with bits for ECC. The d-cache manager 36 maintains a row address table which keeps track of the active row addresses in each memory bank. The addresses of all load/store requests are compared against the entries in this table to determine if a fast access is possible or not. The d-cache manager 36 has one pair of RAS/CAS lines for each bank. Row access strobe (RAS) is used to load and unload DRAM rows into the row buffer (d-cache), and column access strobe (CAS) is used to select the bank.

The memory clock is asynchronous to the bus clock and is selected to optimize the access time to the DRAMs. The bus clock, on the other hand, is selected to match the processor speed.

The refresh controller 40 contains a refresh counter that cycles through the row addresses for all rows on the DRAMs. There is also a clock counter which signals a refresh period. At each such refresh period, the row pointed to by the contents of the refresh counter is refreshed in every DRAM in the system, and the refresh counter is incremented in preparation for the next refresh. When refresh occurs, the contents of the row address table in the d-cache manager are invalidiated.

The ECC unit 38 does a pass-through generation, checking and correcting errors. Single bit errors are corrected and flagged for recording purposes. Double bit errors are signaled to the units on the system bus. The buffer, RAM access and ECC occur in a pipelined fashion and hence once the pipeline is loaded and running, one access per bus cycle is achieved.

Performance studies were done on models of a 32 bit microprocessor coupled to a memory system. A PL/1 type compilation was used as a benchmark program. The purpose was to determine how the number of banks of DRAMs effect performance and d-cache hit ratios. Also evaluated was the effect of a processor with $\frac{1}{2}$-Kbyte and 1-Kbyte on-chip instruction cache coupled with the static column DRAMs. The table below shows the relative performance with the case of standard DRAMs (# of memory banks=0) without instruction or I-cache normalized to 1. It shows how the performance improves with multiple banks of memory and I-cache.

| RELATIVE PERFORMANCE | | |
|---|---|---|
| 1.6— | F | |
| | F | F |
| | F | F |
| | F | F |
| | F | 8F |
| 1.5— | 8F | 8F |
| | 8F | 48F |
| | 8F | F | 48F |
| | 8F | F | 248F |
| | 8F | F | 248F |
| 1.4— | 8F | 8F | 248F |
| | 48F | 8F | 248F |
| | 48F | 48F | 248F |
| | 48F | 48F | 1248F |
| | 48F | 48F | 1248F |
| | 48F | 248F | 1248F |
| 1.3— | 48F | 248F | 1248F |
| | 248F | 248F | 1248F |
| | 248F | 1248F | 01248F |
| | 248F | 1248F | 01248F |
| | 248F | 1248F | 01248F |
| | 248F | 1248F | 01248F |
| 1.2— | 248F | 1248F | 01248F |
| | 248F | 1248F | 01248F |
| | 248F | 1248F | 01248F |
| | 248F | 01248F | 01248F |
| | 248F | 01248F | 01248F |
| | 1248F | 01248F | 01248F |
| 1.1— | 1248F | 01248F | 01248F |
| | 1248F | 01248F | 01248F |
| | 1248F | 01248F | 01248F |
| | 1248F | 01248F | 01248F |
| | 1248F | 01248F | 01248F |
| | 1248F | 01248F | 01248F |
| 1.0— | 01248F | 01248F | 01248F |

LEGEND:
# of mem. banks
# = 0 Zero
= 1 One
= 2 Two
# = 4 Four
# = 8 Eight
# = F Sixteen The first column in the above table is the relative performance figures for no on-chip cache. The second column is the relative performance figures for $\frac{1}{2}$-K byte of I-cache, and the third column is for 1K byte of I-cache.

Figure 6:
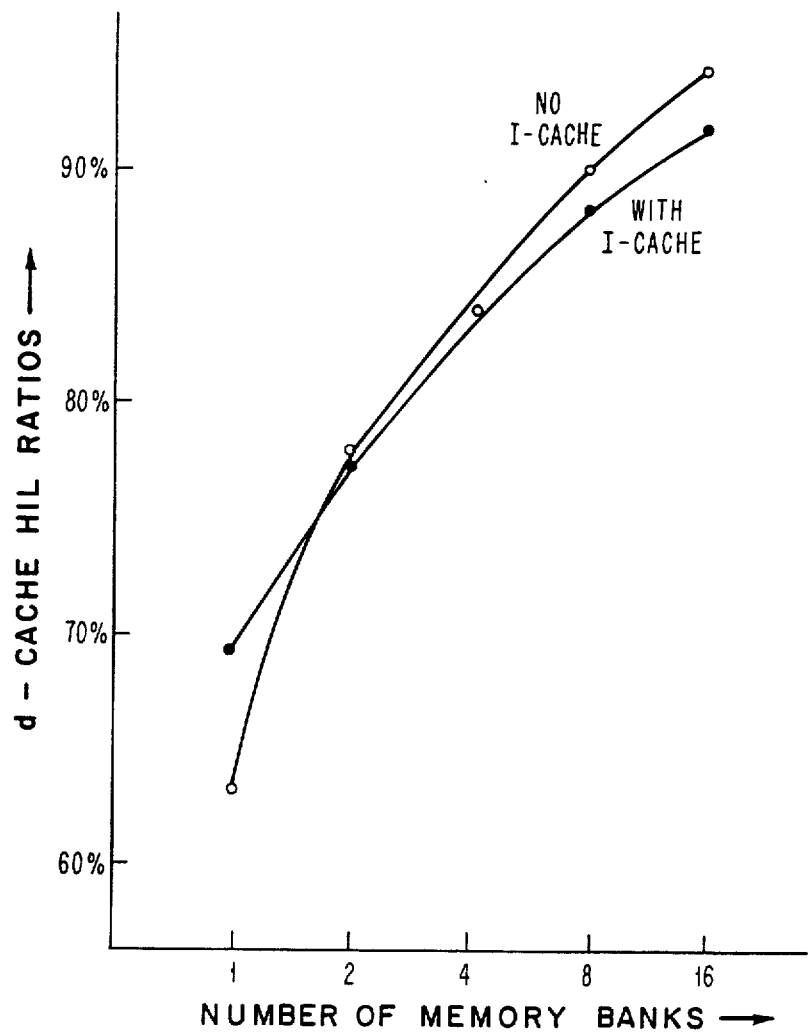
FIG. 6 is a graph showing the d-cache hit ratio.

FIG. 6 shows the d-cache hit ratio. From these performance studies, several conclusions can be drawn. First, the d-cache DRAMs offer a substantial performance advantage over standard DRAMs. Second, the performance of microprocessors with I-cache improves significantly with d-cache DRAMs. Third, the performance is a function of the number of memory banks since the amount of d-cache available increases with the number of banks. Thus, higher performance results from partitioning the available amount of memory into a large number of banks. Fourth, the performance of a system without I-cache can, in fact, be better than one with I-cache. This is because I-cache requires an overhead of sequentially loading the cache buffer, at times with words which may never be used. A d-cache has literally zero operating overhead because the time to load the d-cache is the same as that to access the first word in it. Another reason for better performance is that d-cache caches literally all types of information, code, data, stack, etc. Thus, access to every type of information is speeded up. Fifth, the hit ratios on d-cache is very high. It are the ratio of fast accesses to total accesses. The hit ratio increases with the number of memory banks for both cases, with and without on chip I-cache. This is because the amount of d-cache available increases with the number of banks. Finally, it was also determined that the impact of memory refresh on system performance and hit ratios is marginal. DRAMs with static column mode when used with the memory controller according to the invention can significantly improve (by more than 50%) system performance beyond that of systems with standard DRAMs, even with on-chip I-cache.

What is claimed is:

1. A computer memory system comprising:

a plurality of memory chips organized into a plurality of banks, each memory chip having a matrix of m rows by n columns of memory cells accessed by a row address select signal and a row number address, each bank consisting of an array of static column mode dynamic random access memory chips of the type having an on-chip static buffer for storing an entire row of data of a corresponding row in said memory cell matrix accessed by the row address select signal and a row number address, the static buffers associated with each bank functioning as a distributed cache to hold the last accessed row for the associated bank, the data in the distributed cache corresponding to one of said plurality of banks being accessed by a column address select signal and a column address for that bank; and a memory controller included in said computer memory system for receiving real addresses and connected to the memory banks to access the dynamic random access memory chips for read and write and refresh operations, said memory controller including:

refresh means for periodically refreshing said dynamic random access memory chips, table means for maintaining first and second fields, said first field containing the number of the row which is currently in the distributed cache for each bank and said second field containing valid entry flags for the distributed cache of each bank, said valid entry flags being set to valid for a bank when a row of data is read into the distributed cache in response to a row address select signal and a row number address and being set to invalid after power-on and following a refresh operation in a bank, and accessing means for receiving real addresses and accessing the dynamic random access memory chips for read and write operations, said accessing means extracting bank and row numbers from an address and if an accessed row for that bank is in the distributed cache as indicated by said first field with a valid entry flag set in said second field of said table means, generating a column address and activating the column address select signal for that bank, otherwise inactivating and then activating again the row address select signal for that bank with the row number of a new address to write back the distributed cache contents into the dynamic random access memory cell matrix and load a new row of data for that bank into the distributed cache.

2. The computer memory system as recited in claim 1 wherein said memory chips are MK by N memory chips, where MK is the nominal number of bits in the memory cell matrix and N is a number greater than 1 and is a multiplier for the number of rows in the memory chip organization.

3. The computer memory system as recited in claim 2 wherein MK is 64K, or 256 by 256 bits, and N is 4, or 4 times 256 rows for each memory chip, said memory system having 16 banks of memory chips with each bank containing 64K words, or 256K bytes, of data, to provide a total of 4K words, or 16K bytes, of distributed cache.

4. A method of operating a computer memory system comprising a plurality of memory chips organized into a plurality of banks, each memory chip having a matrix of m rows by n columns of memory cells accessed by a row address select signal and a row number address, each bank consisting of an array of static column mode dynamic random access memory chips of the type having an on-chip static buffer for storing an entire row of data of a corresponding row in said memory cell matrix accessed by the row address select signal and a row number address, said method comprising the steps of:

using the static buffers associated with each bank as a distributed cache to hold the last accessed row for the associated bank;

accessing the data in the distributed cache corresponding to one of said plurality of banks by a column address select signal and a column address for that bank;

periodically refreshing said dynamic random access memory chips;

maintaining a table having first and second fields, said first field containing the number of the row which is currently in the distributed cache for each bank and said second field containing valid entry flags for the distributed cache for each bank, said valid entry flags being set to valid for the bank when a row of data is read into the distributed cache in response to a row address select signal and a row number address and being set to invalid after power-on and following a refresh operation in a bank; and receiving a real address for accessing the dynamic random access memory chips for read and write operations by extracting bank and row numbers for an address and if an accessed row for that bank is in the distributed cache as indicated by said first field with a valid entry flag set in said second field then generating a column address and activating the column address signal for that bank, otherwise inactivating and then activating again the row address select signal for that bank with the row number of a new address to write back the distributed cache contents into the dynamic random access memory cell matrix and load a new row of data for that bank into the distriburted cache.

* * * * *